May 19, 1931.  A. SPYER  1,806,371
BOILER FEED WATER SYSTEM
Filed Oct. 19, 1925
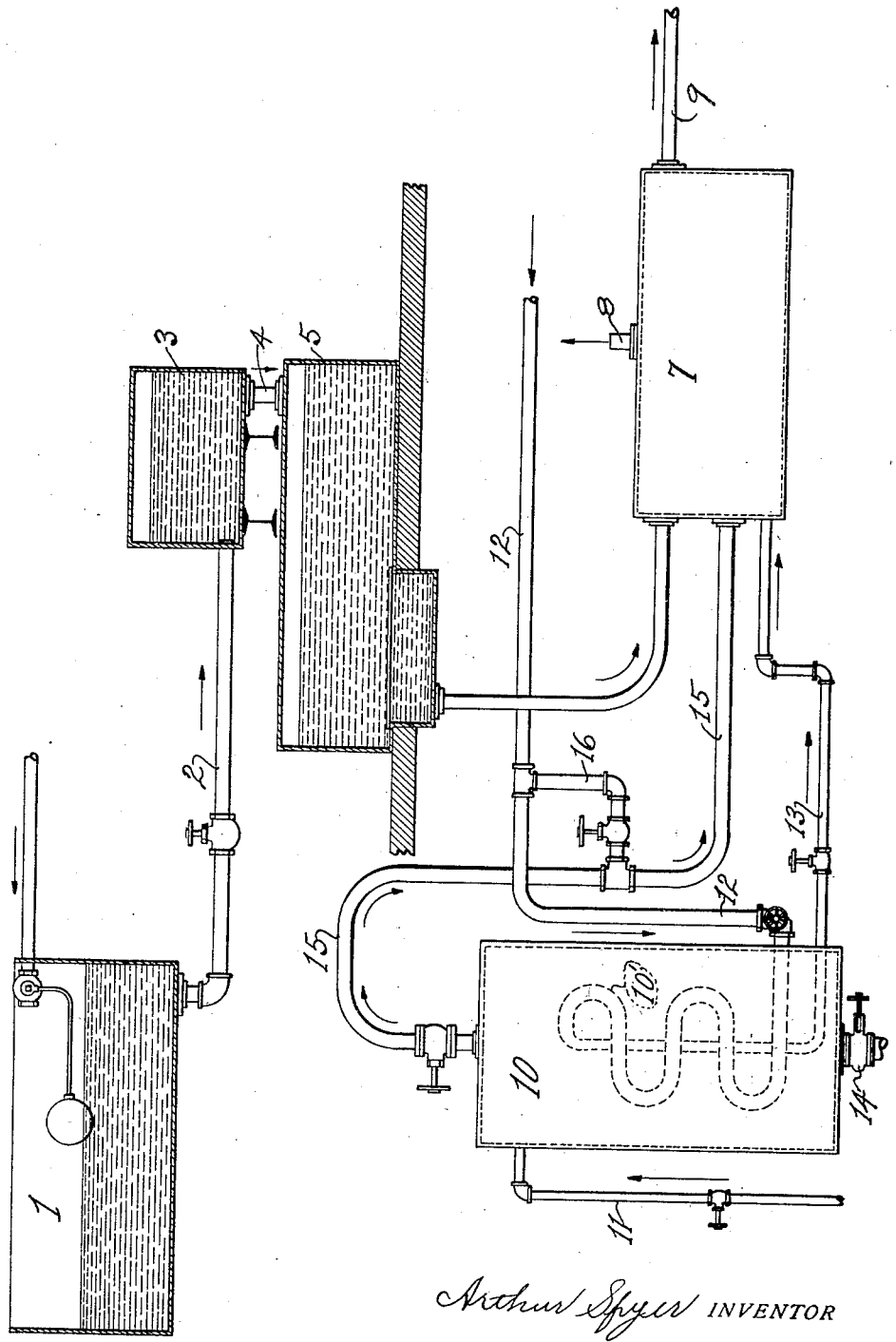
Arthur Spyer INVENTOR
BY
Gifford & Scull ATTORNEYS Patented May 19, 1931

1,806,371

UNITED STATES PATENT OFFICE

ARTHUR SPYER, OF LONDON, ENGLAND, ASSIGNOR TO THE BABCOCK & WILCOX COMPANY, OF BAYONNE, NEW JERSEY, A CORPORATION OF NEW JERSEY

BOILER FEED WATER SYSTEM

Application filed October 19, 1925, Serial No. 63,208, and in Great Britain June 16, 1925.

This invention relates to a combined evaporator and feed water system for supplying pure feed water to the boilers in steam generating plants, and will be understood from the description in connection with the accompanying drawing, in which a diagrammatic assembly of apparatus is represented for carrying out the invention.

In the apparatus illustrated, condensate from the prime movers of the plant and other sources is collected in a collecting tank 1. From the collecting tank 1, the water passes through a valved pipe 2 to a treating tank 3 where lime or some other substance is added and from thence through pipe 4 to a filtering and reaction tank 5 and from thence into a deaerator 7. If desired, the tanks 3 and 5 may be omitted and the water will then be delivered directly from tank 1 to tank 7.

The tank 7 is provided with any of the usual arrangements by which the water therein may be heated by being mingled directly with steam or hot water or both, the tank having an air and gas outlet 8, which may, if desired, be connected to a pressure reducing device, such as an air pump, by which a sub-atmospheric pressure may be maintained in tank 7.

An evaporator 10 of a well-known type is provided to supply make-up water to the power system. The quantity of make-up water to be added passes into the evaporator through valved pipe 11 and live steam for the steam coils 10' of the evaporator is drawn from valved pipe 12. The condensate from the evaporator heating coils together with any uncondensed steam passes through valved pipe 13 into the water in tank 7. The make-up water is boiled in the evaporator and the steam therefrom passes through valved pipe 15 into tank 7, where it mingles with and heats the water therein and, at the same time, is condensed. A blow-off valve 14 in evaporator 10 permits the withdrawal of water with the solids left in the evaporator. Pipe 9 leads the water from the deaerator to the boiler.

In the system described, the make-up water is supplied to the boiler feed water in the form of steam so that none of the impurities in the make-up water are carried into the system, and, at the same time, the heat in this steam, together with the heat from the evaporator coils, is transferred to the entire body of mingled condensate and make-up water to heat the same to a temperature sufficient to drive off any air or other gases therein. If the heat from the evaporator delivered to the deaerator is not sufficient to heat the entire mass of water in the deaerator to a temperature sufficient to deaerate, then additional live steam may be supplied for this purpose by opening the valve in pipe 16, connecting steam supply pipe 12 with pipe 15. By maintaining the pressure in tank 7 below atmopshere, the amount of steam required to boil the water therein is reduced.

In the treating and filtering tanks, if used, the condensate may be treated with any desired chemical, such as lime, to throw down any scale forming substances contained in the condensate from tank 1, the treated water being filtered in tank 5 before entering the deaerator 7.

I claim:—

1. The method of treating feed water for a steam boiler of a power plant, which comprises passing condensate from the exhaust steam of the plant into a deaerating tank, evaporating make-up water by steam out of contact with the make-up water, passing the steam therefrom and the condensate from such evaporating steam into and mingling them with the condensate in said tank to heat the same, and permitting the air and gases free by such heating to pass out of the deaerating tank.

2. The method of treating feed water for a steam boiler of a power plant, which comprises passing condensate from the exhaust steam of the plant into a deaerating tank, evaporating make-up water, by steam out of contact with the make-up water, passing the steam therefrom and the condensate from such evaporating steam into and mingling them with the condensate in said tank to heat the same maintaining a sub-atmospheric pressure in said deaerating tank, and permitting the air and gases freed by such heating to pass out of the dearating tank.

3. The method of treating feed water for a steam boiler of a power plant, which comprises passing condensate from the exhaust steam of the plant into a deaerating tank, evaporating make-up water by steam out of contact with the make-up water, passing the steam therefrom and the condensate from such evaporating steam into and mingling them with the condensate in said tank to heat the same, supplying additional live steam to the water in said deaerating tank to boil the entire mass of water in said tank, and permitting the air and gases freed by such heating to pass out of the deaerating tank.

4. The method of treating feed water for a steam boiler of a power plant, which comprises passing condensate from the exhaust steam of the plant into a deaerating tank, evaporating make-up water by steam out of contact with the make-up water, passing the steam therefrom and the condensate from such evaporating steam into and mingling them with the condensate in said tank to heat the same, applying additional live steam to the water in said deaerating tank to boil the entire mass of water in said tank, maintaining a sub-atmospheric pressure in said deaerating tank, and permitting the air and gases freed by such heating to pass out of the deaerating tank.

5. In combination, a tank to receive condensate from a power plant, an evaporator having a steam heating coil therein, a pipe connecting the steam outlet of the evaporator with said tank, a pipe connecting the outlet end of said heating coil with said tank, said tank having an outlet for gas and air freed from the water therein, and an outlet pipe for the water in said tank.

6. In combination, a tank to receive condensate from a power plant, an evaporator having a steam heating coil therein, a pipe connecting the steam outlet of the evaporator with said tank, a pipe connecting the outlet end of said heating coil with said tank, said tank having an outlet for gas and air freed from the water therein, an outlet pipe for the water in said tank, and a pipe to supply live steam to the water in said tank.

ARTHUR SPYER.